US012736223B2

(12) United States Patent
Takahashi et al.

(10) Patent No.: US 12,736,223 B2
(45) Date of Patent: Sep. 15, 2026

(54) LEAKAGE GAS EMISSION SYSTEM

(71) Applicant: MITSUBISHI HEAVY INDUSTRIES, LTD., Tokyo (JP)

(72) Inventors: Takefumi Takahashi, Tokyo (JP); Takashi Shiraiwa, Tokyo (JP); Kazushige Kuwazuru, Tokyo (JP); Rei Ikeda, Tokyo (JP); Atsuhiko Kanebako, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/583,305

(22) Filed: Feb. 21, 2024

(65) Prior Publication Data

US 2024/0310049 A1 Sep. 19, 2024

(30) Foreign Application Priority Data

Mar. 13, 2023 (JP) ................................ 2023-038225

(51) Int. Cl.
*F23R 3/00* (2006.01)
*F02C 7/232* (2006.01)
*F23R 3/36* (2006.01)

(52) U.S. Cl.
CPC ................ *F23R 3/36* (2013.01); *F02C 7/232* (2013.01)

(58) Field of Classification Search
None
See application file for complete search history.

(56) References Cited

U.S. PATENT DOCUMENTS

| | | | | |
|---|---|---|---|---|
| 4,972,867 | A * | 11/1990 | Ruesch | F16K 37/00 137/15.17 |
| 5,141,013 | A * | 8/1992 | Zink | B61D 5/00 137/68.14 |
| 2002/0092562 | A1* | 7/2002 | Kami | B60K 15/03006 137/312 |
| 2014/0096526 | A1* | 4/2014 | Marquez | F23N 1/007 60/734 |
| 2015/0308915 | A1* | 10/2015 | Konatham | F02C 7/20 73/40.7 |
| 2017/0328806 | A1* | 11/2017 | Kaneko | G01M 3/26 |
| 2021/0172342 | A1* | 6/2021 | Oba | F02C 7/20 |
| 2022/0299395 | A1* | 9/2022 | Ponyavin | G01M 3/025 |
| 2022/0357249 | A1 | 11/2022 | Merchant et al. | |
| 2023/0112286 | A1* | 4/2023 | Rao | F02C 7/22 60/772 |

FOREIGN PATENT DOCUMENTS

| | | |
|---|---|---|
| JP | 59-155533 | 9/1984 |
| JP | 2022-145550 | 10/2022 |
| JP | 2022-172445 | 11/2022 |

* cited by examiner

*Primary Examiner* — Edwin Kang
(74) *Attorney, Agent, or Firm* — Wenderoth, Lind & Ponack, L.L.P.

(57) ABSTRACT

A leakage gas emission system includes an enclosure surrounding at least part of a fuel supply system of a combustion device. The enclosure is provided with an outside emission unit for emitting internal gas to the outside. Fuel gas leaking from a leakage spot of the fuel supply system surrounded by the enclosure is taken in from an inlet port at one end of a first pipe and emitted from an emission port at another end toward the outside emission unit.

12 Claims, 5 Drawing Sheets

LEAKAGE GAS EMISSION SYSTEM

CROSS-REFERENCE TO RELATED APPLICATIONS

This application claims the benefit of priority to Japanese Patent Application Number 2023-038225 filed on Mar. 13, 2023. The entire contents of the above-identified application are hereby incorporated by reference.

TECHNICAL FIELD

The present disclosure relates to a leakage gas emission system.

RELATED ART

In a combustion device operated by combusting fuel gas, such as a gas turbine or a boiler, combustible fuel gas is supplied by a fuel supply system. The fuel supply system of this type of combustion device is configured to include a valve (fuel valve) and a pipe for handling fuel gas, and the fuel gas may leak from a gap such as a gap between components thereof or a gap of a connected portion thereof. In addition, at least part of the fuel supply system may be disposed in an enclosure, and the inside thereof may reach a high temperature of several hundred degrees during operation of the combustion device. In this case, the fuel gas (leakage gas) leaking in the enclosure may become an ignition source.

For example, JP 2022-172445 A discloses a countermeasure against such leakage gas in an enclosure. JP 2022-172445 A discloses a configuration in which ventilation air can be introduced from the outside through a ventilation inlet duct into a gas turbine compartment (enclosure) in which a gas turbine is disposed, and fuel gas leaking from the gas turbine can be emitted as exhaust air together with the ventilation air to the outside through a ventilation exhaust duct.

SUMMARY

Although many types of fuel gases can be used in a combustion device, natural gas, which is clean energy, may be used as a fuel in this type of combustion device because of growing awareness of environmental problems. Natural gas is mined as feedstock natural gas from a gas field or the like, liquefied, and purified, and thus natural gas is used as liquefied natural gas (LNG). In the case of a fuel supply system that handles fuel gas having relatively large molecules such as natural gas, there is a relatively low risk of leakage, and thus a normal leak-off system (a system that emits leakage gas leaking from a leakage spot to a safety area) may not be installed.

In recent years, a combustion device that can perform so-called multi-fuel combustion operation in which main fuel gas such as natural gas is mixed with other fuel gas such as hydrogen gas and combusted has been developed. In particular, hydrogen gas has a high risk of leakage due to its small molecules, and a more sophisticated countermeasure against leakage is required. As a countermeasure against such leakage, it is conceivable to additionally provide a fuel supply system with a leak-off system. However, it is necessary to make a modification so as to additionally provide the leak-off system at a leakage spot, which increases the cost.

At least one embodiment of the present disclosure has been made in view of the above circumstances, and an object thereof is to provide a leakage gas emission system that can efficiently emit leakage gas from a leakage spot surrounded by an enclosure to the outside with a simple configuration.

In order to solve the above problem, a leakage gas emission system according to at least one embodiment of the present disclosure includes an enclosure surrounding at least part of a fuel supply system supplying fuel gas to a combustion device configured to combust the fuel gas, an outside emission unit emitting gas inside the enclosure to an outside, and a first pipe including an inlet port at one end and an emission port at another end, the inlet port taking in the fuel gas leaking from a leakage spot of the fuel supply system surrounded by the enclosure, the emission port emitting the fuel gas toward the outside emission unit.

According to at least one embodiment of the present disclosure, it is possible to provide a leakage gas emission system that can efficiently emit leakage gas from a leakage spot surrounded by an enclosure to the outside with a simple configuration.

BRIEF DESCRIPTION OF DRAWINGS

The disclosure will be described with reference to the accompanying drawings, wherein like numbers reference like elements.

DESCRIPTION OF EMBODIMENTS

Figure 1:
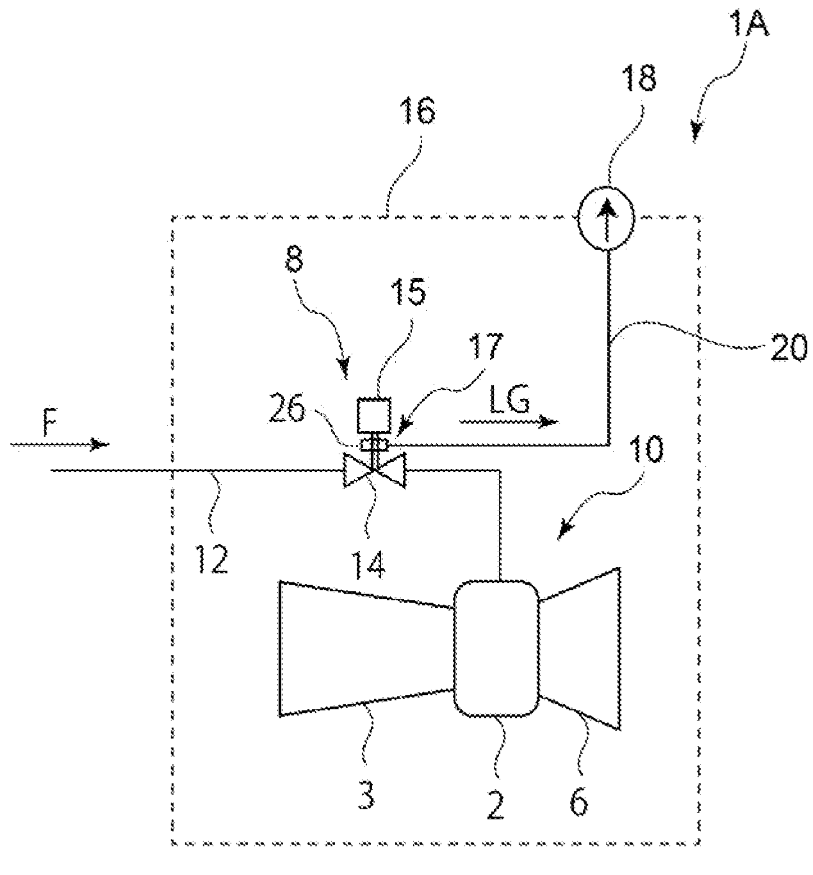
FIG. 1 is a schematic diagram illustrating a configuration of a leakage gas emission system according to an embodiment.

Some embodiments of the present invention will be described below with reference to the accompanying drawings. However, configurations described in the embodiments or illustrated in the drawings shall be interpreted as illustrative only and not intended to limit the scope of the present invention.

FIG. 1 is a schematic diagram illustrating a configuration of a leakage gas emission system 1A according to an embodiment. The leakage gas emission system 1A according to at least one embodiment is applied to a combustion device that can combust fuel gas and is particularly a system for emitting leakage gas to the outside from a fuel supply system for supplying fuel gas to a combustion device. FIG. 1 illustrates, as an example of the combustion device, a gas turbine 10 including a combustor 2 that can combust fuel gas F.

The gas turbine 10 includes a compressor 3 for generating compressed air, the combustor 2 for generating combustion gas by mixing and combusting the compressed air generated by the compressor 3 and the fuel gas F, a fuel supply system 8 for supplying the fuel gas F to the combustor 2, and a turbine 6 that can be driven by the combustion gas. The compressor 3 and the turbine 6 are coupled to one shaft. In the gas turbine 10 having such a configuration, the compressed air compressed by the compressor 3 and the fuel gas F supplied from the fuel supply system 8 are supplied to the combustor 2, mixed, and combusted, and thus the combustion gas is generated. The combustion gas flows into the turbine 6 and functions as power for driving the turbine 6.

The fuel supply system 8 is configured to supply the fuel gas F to the combustor 2. FIG. 1 schematically illustrates part of the fuel supply system 8, and the fuel supply system 8 includes a fuel gas pipe 12 and a fuel valve 14 provided on the fuel gas pipe 12. The fuel gas pipe 12 is a tubular member having a space therein through which the fuel gas F can pass and extends from a supply source of the fuel gas F (not illustrated) to the combustor 2 to which the fuel gas F is supplied. The fuel valve 14 may be a flow control valve for controlling the flow rate of the fuel gas F flowing through the fuel gas pipe 12 or may be a shutoff valve for shutting off the fuel gas F flowing through the fuel gas pipe 12.

At least part of such a fuel supply system 8 is surrounded by an enclosure 16. FIG. 1 illustrates, as an example, a configuration in which part of the fuel gas pipe 12 and the fuel valve 14 constituting the fuel supply system 8, as well as the gas turbine 10, are surrounded by the enclosure 16.

Further, the fuel supply system 8 may handle, as the fuel gas F, one type of fuel gas alone or a plurality of types of fuel gases in a mixed manner. As the fuel gas F, for example, liquefied natural gas (LNG) or hydrogen gas can be handled. In particular, the fuel gas F may contain a first fuel and a second fuel having a smaller molecular size than the first fuel. In this case, for example, the first fuel is liquefied natural gas and the second fuel is hydrogen gas.

In the gas turbine 10 having the above-described configuration, there are not a few leakage spots 17 where the fuel gas F leaks out in the fuel supply system 8. FIG. 1 illustrates, as an example of the leakage spots 17, the vicinity of a gland portion 15 of the fuel valve 14, but any gap of the member (the fuel gas pipe 12, the fuel valve 14, or the like) constituting the fuel supply system 8 can be the leakage spot 17.

Note that, in the following description, the fuel gas F leaking from the leakage spot 17 is referred to as "leakage gas LG" as appropriate.

Figure 2:
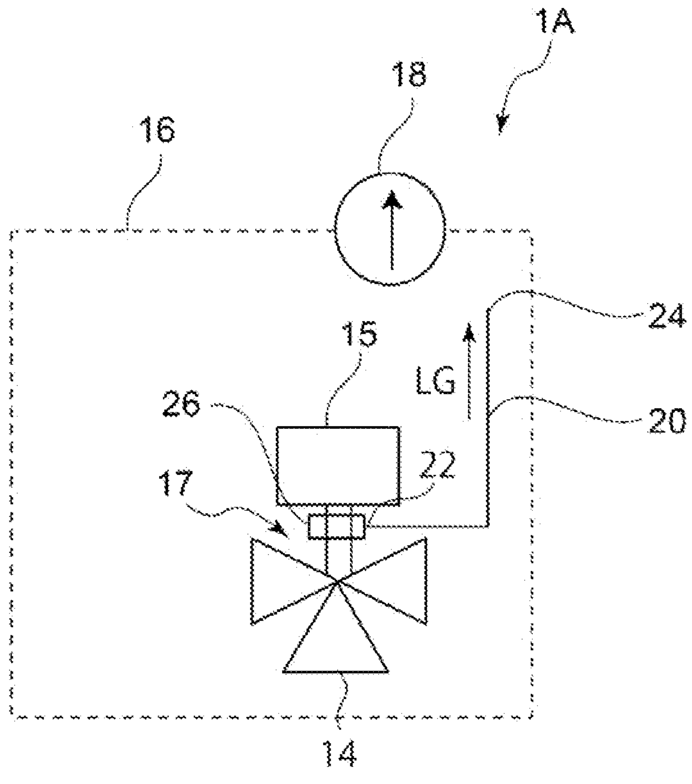
FIG. 2 is a schematic diagram illustrating a leakage spot in an enclosure of FIG. 1 together with a peripheral configuration in a partially extracted manner.

Here, FIG. 2 is a schematic diagram illustrating the leakage spot 17 in the enclosure 16 of FIG. 1 together with the peripheral configuration in a partially extracted manner. In this embodiment, the leakage gas emission system 1A includes an outside emission unit 18 and a first pipe 20, in addition to the enclosure 16 described above.

The outside emission unit 18 is configured to emit the leakage gas LG in the enclosure 16 to the outside. The specific configuration of the outside emission unit 18 is not limited. For example, the outside emission unit 18 may have a simple configuration such as a communication hole that enables the inside and the outside of the enclosure 16 to communicate with each other. In the present embodiment, the outside emission unit 18 includes a negative pressure fan that is disposed in such a communication hole and that can be driven by power (for example, electric power) supplied from the outside. In this case, the negative pressure fan is driven to emit the leakage gas LG inside the enclosure 16 to the outside through the communication hole, and thus a negative pressure can be applied to the inside of the enclosure 16.

Note that the outside emission unit 18 is provided at the top surface of the enclosure 16. Accordingly, the leakage gas LG having a specific gravity lighter than that of air can be efficiently emitted to the outside.

The first pipe 20 is configured to guide the leakage gas LG leaking from the leakage spot 17 to the outside emission unit 18. In the present embodiment, the first pipe 20 includes, at one end, an inlet port 22 for taking in the leakage gas LG leaking from the leakage spot 17, and, at another end, an emission port 24 for emitting the leakage gas LG toward the outside emission unit 18.

In the enclosure 16, the vicinity of the inlet port 22 has a relatively high pressure due to the leakage gas LG from the leakage spot 17. Thus, due to the pressure differential generated between the inlet port 22 and the emission port 24, the leakage gas LG from the leakage spot 17 is efficiently guided to the outside emission unit 18 through the first pipe 20. Then, the leakage gas LG guided to the outside emission unit 18 is emitted to the outside from the outside emission unit 18.

In the present embodiment, the leakage spot 17 is surrounded by a surrounding portion 26. The surrounding portion 26 surrounds the leakage spot 17 to prevent the leakage gas LG leaking from the leakage spot 17 from diffusing to the surroundings. In this example, the surrounding portion 26 having a substantially ring shape is provided around the leakage spot 17. The inlet port 22 of the first pipe 20 is connected to the surrounding portion 26. Thus, the surrounding portion 26 can prevent the leakage gas LG leaking from the leakage spot 17 from diffusing to the surroundings, and the leakage gas LG can be suitably taken into the inlet port 22 of the first pipe 20. In addition, the pressure in the surrounding portion 26 is increased by the leakage gas LG leaking from the leakage spot 17, and thus it is possible to suitably form the pressure differential between the inlet port 22 and the emission port 24 of the first pipe 20 and effectively promote emission of the leakage gas LG through the first pipe 20.

Note that the inlet port 22 may be provided opposing the leakage spot 17. In this case, although the inlet port 22 is not connected to the leakage spot 17, the leakage gas LG leaking from the leakage spot 17 can be taken into the first pipe 20 from the inlet port 22 due to the pressure differential between the inlet port 22 and the emission port 24.

In the gas turbine 10, various types of gases are handled as the fuel gas F. In particular, when the fuel gas F contains a component having a small molecular size such as hydrogen gas, part of the fuel gas F is likely to leak out as the leakage gas LG from the leakage spot 17. According to the leakage gas emission system 1A having the above-described configuration, the leakage gas LG in the enclosure 16 surrounding the leakage spot 17 can be efficiently emitted to the outside by being guided to the outside emission unit 18 through the first pipe 20. Accordingly, even when the combustion device (the gas turbine 10) having a high temperature during operation is accommodated in the enclosure 16 together with the leakage spot 17, it is possible to effectively reduce a risk of ignition.

Figure 3:
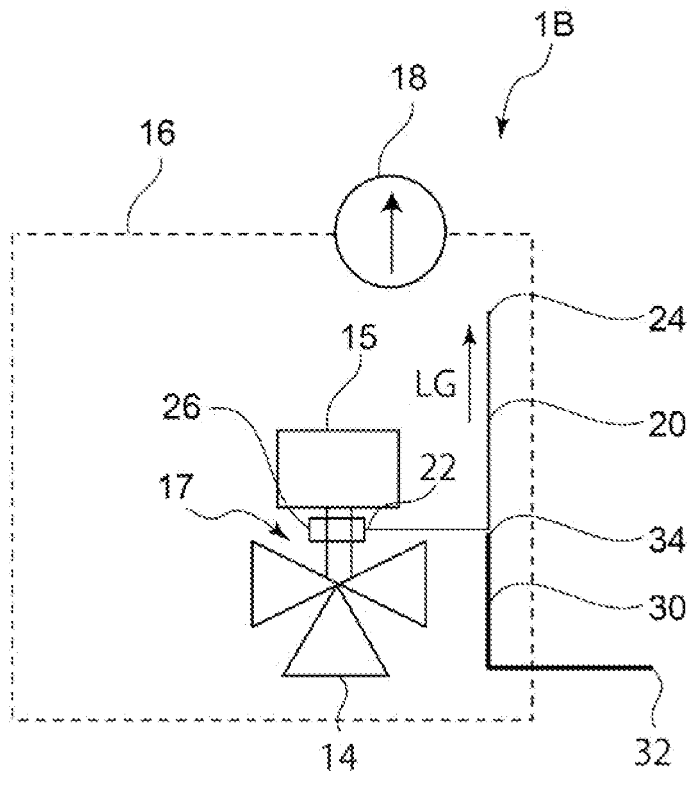
FIG. 3 is a first modification example of FIG. 2.

FIG. 3 is a first modification example of FIG. 2. A leakage gas emission system 1B according to the first modification example further includes a second pipe 30 as compared with the above-described leakage gas emission system 1A. The second pipe 30 is configured such that an air inlet port 32 located outside an enclosure 16 is at one end and another end is connected to an air emission port 34 provided in the middle of a first pipe 20. That is, the second pipe 30 is connected to the middle of the first pipe 20 and thus is configured to combine, in the middle of the first pipe 20, air taken in from the outside through the air inlet port 32 with leakage gas LG flowing through the first pipe 20. Thus, the flow of the leakage gas LG flowing through the first pipe 20 toward the outside emission unit 18 can be promoted by the draft effect of the air supplied from the second pipe 30. As a result, the leakage gas LG can be more efficiently emitted to the outside through the first pipe 20.

Figure 4:
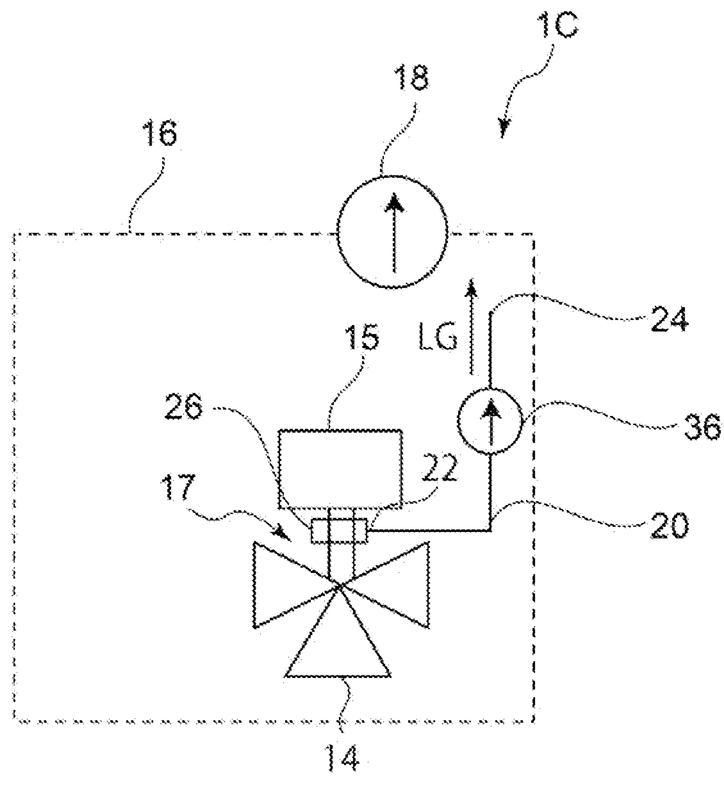
FIG. 4 is a second modification example of FIG. 2.

FIG. 4 is a second modification example of FIG. 2. A leakage gas emission system 1C according to the second modification example is additionally provided with a fan device 36 at a first pipe 20 as compared with the above-described leakage gas emission system 1A. This can promote emission of leakage gas LG leaking from a leakage spot 17 toward an outside emission unit 18 through the first pipe 20. In particular, by directing an emission port 24 of the first pipe 20 toward the outside emission unit 18, the leakage gas LG guided through the first pipe 20 can be efficiently guided to the outside emission unit 18, and the inside of an enclosure 16 can be suitably ventilated.

Figure 5:
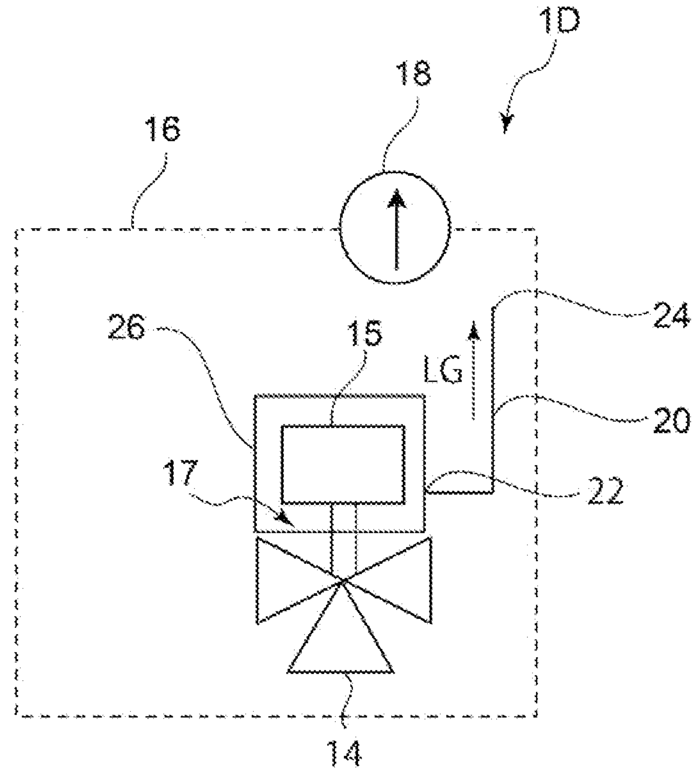
FIG. 5 is a third modification example of FIG. 2.

FIG. 5 is a third modification example of FIG. 2. In a leakage gas emission system 1D according to the third modification example, a surrounding portion 26 is provided so as to cover the whole of a gland portion 15 of a fuel valve 14 as compared with the above-described leakage gas emission system 1A. In other words, the surrounding portion 26 is configured to surround the gland portion 15 of the fuel valve 14 not only in the circumferential direction but also in the vertical direction. This can more reliably prevent leakage gas LG leaking from the gland portion 15 of the fuel valve 14 from diffusing to the surroundings and can emit the leakage gas LG to the outside from an outside emission unit 18 through a first pipe 20.

As described above, according to each of the above-described embodiments, it is possible to provide a leakage gas emission system that can efficiently emit the leakage gas LG from the leakage spot 17 surrounded by the enclosure 16 to the outside with a simple configuration.

In addition, it is possible to replace the components in the above-described embodiments with well-known components as appropriate without departing from the essence of the present disclosure, and the above-described embodiments may be combined as appropriate.

Each of the contents described in the above embodiments is grasped as follows, for example.

(1) A leakage gas emission system according to an aspect includes an enclosure surrounding at least part of a fuel supply system supplying fuel gas to a combustion device configured to combust the fuel gas, an outside emission unit emitting gas inside the enclosure to an outside, and a first pipe including an inlet port at one end and an emission port at another end, the inlet port taking in the fuel gas leaking from a leakage spot of the fuel supply system surrounded by the enclosure, the emission port emitting the fuel gas toward the outside emission unit.

According to the above aspect (1), the fuel gas leaking from the leakage spot of the fuel supply system in the enclosure is taken in from the inlet port provided at the one end of the first pipe, passes through the first pipe, and is emitted toward the outside emission unit from the emission port provided at the other end of the first pipe. The fuel gas leaking from the leakage spot makes the pressure at the one end of the first pipe higher than the pressure at the other end. Thus, due to the pressure differential between both ends of the first pipe, the leakage gas from the leakage spot passes through the first pipe, is efficiently guided to the outside emission unit, and is emitted to the outside.

(2) According to another aspect, the leakage gas emission system according to the above aspect (1) further includes a second pipe including an air inlet port at one end and an air emission port at another end, the air inlet port taking in air from the outside to an inside of the enclosure, the air emission port being provided at the first pipe to combine, partway along the first pipe, the air taken in from the air inlet port with the fuel gas.

According to the above aspect (2), the air taken in from the air inlet port provided at the one end of the second pipe passes through the second pipe and is supplied from the other end of the second pipe to the air emission port provided in the middle of the first pipe. Thus, the flow of the fuel gas flowing through the first pipe to the outside emission unit can be promoted by the draft effect of the air supplied from the second pipe to the air emission port. As a result, the leakage gas can be more efficiently emitted to the outside through the first pipe.

(3) According to another aspect, the inlet port is provided connected to the leakage spot or opposing the leakage spot in the above aspect (1) or (2).

According to the above aspect (3), the inlet port of the first pipe is disposed to be connected to or face the leakage spot in the enclosure. As a result, the fuel gas leaking from the leakage spot can be suitably taken into the first pipe.

(4) According to another aspect, the leakage gas emission system according to the above aspect (3) further includes a surrounding portion surrounding at least part of the leakage spot, in which the inlet port is connected to the surrounding portion.

According to the above aspect (4), the inlet port of the first pipe is connected to the surrounding portion surrounding at least part of the leakage spot in the enclosure. Thus, the surrounding portion can prevent the fuel gas leaking from the leakage spot from diffusing to the surroundings and the fuel gas can be suitably taken into the inlet port of the first pipe. In addition, since the pressure inside the surrounding portion is increased by the fuel gas leaking from the leakage spot, the pressure differential between the inlet port and the emission port of the first pipe can be suitably formed, and emission of the leakage gas through the first pipe can be effectively promoted.

(5) According to another aspect, the surrounding portion surrounds the leakage spot entirely in the above aspect (4).

According to the above aspect (5), the surrounding portion surrounds the leakage spot entirely, and thus it is possible to more accurately emit the fuel gas leaking from the leakage spot to the outside without diffusing the fuel gas to the surroundings.

(6) According to another aspect, the outside emission unit is provided at a top surface of the enclosure in any of the above aspects (1) to (5).

According to the above aspect (6), the outside emission unit is provided at the top surface of the enclosure, and thus it is possible to efficiently emit, to the outside, the fuel gas having a specific gravity lighter than the specific gravity of air.

(7) According to another aspect, the outside emission unit is configured to apply a negative pressure to an inside of the enclosure in any of the above aspects (1) to (6).

According to the above aspect (7), the outside emission unit is configured to apply a negative pressure to the inside of the enclosure by, for example, generating an air flow from the inside of the enclosure to the outside. Examples of such a configuration include a negative pressure fan. Thus, the leakage gas guided to the outside emission unit through the first pipe can be efficiently emitted from the inside of the enclosure to the outside.

(8) According to another aspect, a fan device is provided at the first pipe in any of the above aspects (1) to (7).

According to the above aspect (8), the fan device is provided at the first pipe, and thus it is possible to further promote emission of the leakage gas toward the outside emission unit through the first pipe.

(9) According to another aspect, the fuel gas includes a first fuel and a second fuel having a molecular size smaller than a molecular size of the first fuel in any of the above aspects (1) to (8).

According to the above aspect (9), it is possible to suitably emit, from the enclosure to the outside, the leakage gas of the fuel supply system handling a mixed fuel in which the first fuel is mixed with the second fuel having a smaller molecular size than the molecular size of the first fuel.

(10) According to another aspect, the first fuel is liquefied natural gas, and the second fuel is hydrogen gas in the above aspect (9).

According to the above aspect (10), it is possible to suitably emit, from the enclosure to the outside, the leakage gas of the fuel supply system handling the mixed fuel including the natural gas and the hydrogen gas.

(11) According to another aspect, the leakage spot is a fuel valve provided at the fuel supply system in any of the above aspects (1) to (10).

According to the above aspect (11), the fuel gas leaking from the leakage spot such as the gland portion in the fuel valve included at the fuel supply system can be suitably emitted to the outside.

(12) According to another aspect, the enclosure accommodates the combustion device together with the leakage spot in any of the above aspects (1) to (11).

According to the above aspect (12), the combustion device is accommodated in the enclosure together with the leakage spot of the fuel supply system. As a result, even when the ambient temperature in the enclosure becomes high during operation of the combustion device, the leakage gas in the enclosure can be suitably emitted to the outside, which can lower a risk of ignition.

(13) According to another aspect, the combustion device is a gas turbine or a boiler in any of the above aspects (1) to (12).

According to the above aspect (13), the fuel gas leaking from the fuel supply system of the combustion device, which is a gas turbine or a boiler, in the enclosure can be suitably emitted to the outside.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A leakage gas emission system comprising:

an enclosure surrounding at least part of a fuel supply system configured to supply fuel gas to a combustion device configured to combust the fuel gas with the combustion device;

an outside emission unit configured to emit gas inside the enclosure to an outside;

a first pipe including an inlet port at a first terminal end and an emission port at a second terminal end in the enclosure, the inlet port being provided at a position closer to a leakage spot of the fuel supply system surrounded by the enclosure than the combustion device to take in the fuel gas leaking from the leakage spot, the inlet port and the emission port respectively being at the first and second terminal ends of the first pipe, the inlet port being arranged so as to oppose the leakage spot, the emission port being exposed and open to an interior of the enclosure and being configured to emit the fuel gas toward the outside emission unit; and a surrounding portion surrounding at least a part of the leakage spot, wherein the inlet port is connected to the surrounding portion, wherein the emission port is spaced apart from the outside emission unit, and wherein the leakage spot is a portion of a fuel valve provided at the fuel supply system.

2. The leakage gas emission system according to claim 1, further comprising:

a second pipe including an air inlet port at one end and an air emission port at another end, the air inlet port being configured to take in air from the outside to the interior of the enclosure, the air emission port being provided at the first pipe to combine, partway along the first pipe, the air taken in from the air inlet port with the fuel gas.

3. The leakage gas emission system according to claim 1, wherein the surrounding portion surrounds the leakage spot entirely.

4. The leakage gas emission system according to claim 1, wherein the outside emission unit is provided at a top surface of the enclosure.

5. The leakage gas emission system according to claim 1, wherein the outside emission unit is configured to apply a negative pressure to an inside of the enclosure.

6. The leakage gas emission system according to claim 1, wherein a fan device is provided at the first pipe.

7. The leakage gas emission system according to claim 1, wherein the fuel gas includes a first fuel and a second fuel, the second fuel having a molecular size smaller than a molecular size of the first fuel.

8. The leakage gas emission system according to claim 7, wherein the first fuel is liquefied natural gas, and the second fuel is hydrogen gas.

9. The leakage gas emission system according to claim 1, wherein the enclosure accommodates the combustion device together with the leakage spot.

10. The leakage gas emission system according to claim 1, wherein the combustion device is a gas turbine or a boiler.

11. The leakage gas emission system according to claim 1, wherein the leakage spot is a gland portion of the fuel valve provided at the fuel supply system, and the surrounding portion surrounds only a portion of the fuel valve that includes at least a portion of the gland portion.

12. The leakage gas emission system according to claim 1, wherein the enclosure surrounds an entirety of the combustion device, and wherein the combustion device is a gas turbine.

* * * * *